US006224080B1

(12) United States Patent
Ross

(10) Patent No.: US 6,224,080 B1
(45) Date of Patent: May 1, 2001

(54) SPOKELESS BICYCLE SYSTEM

(76) Inventor: Bennett Ross, 1262 Dunamon Dr., Bartlett, IL (US) 60103

( * ) Notice: Subject to any disclaimer, the term of this patent is extended or adjusted under 35 U.S.C. 154(b) by 0 days.

(21) Appl. No.: 09/425,746

(22) Filed: Oct. 22, 1999

(51) Int. Cl.[7] .................................................... B62K 3/02
(52) U.S. Cl. ...................... 280/281.1; 280/260; 280/288; 280/279
(58) Field of Search .................. 301/1, 5.1; 280/210, 280/259, 260, 279, 288, 281.1; D12/118, 123

(56) References Cited

U.S. PATENT DOCUMENTS

| | | | |
|---|---|---|---|
| 858,489 | * | 7/1907 | Vaughn . |
| 3,329,444 | * | 7/1967 | Lidov . |
| 4,045,096 | * | 8/1977 | Lidov ........................................ 305/7 |
| 5,248,019 | * | 9/1993 | Sbarro ................................. 180/219 |
| 5,419,619 | * | 5/1995 | Lew ...................................... 301/5.1 |
| 5,669,619 | * | 9/1997 | Kim ................................... 280/250.1 |
| 6,050,584 | * | 4/2000 | Sibson ................................. 280/283 |

FOREIGN PATENT DOCUMENTS

4104720 * 8/1992 (DE) .

* cited by examiner

*Primary Examiner*—Brian L. Johnson
*Assistant Examiner*—Avraham H. Lerner
(74) *Attorney, Agent, or Firm*—Michael S. Neustel

(57) ABSTRACT

A spokeless bicycle system for providing a bicycle that does not have spokes within the wheels. The inventive device includes a frame having a seat structure and handle bars, a rear bracket having rear bearings within that rotatably engages a rear wheel, a front bracket having front bearings within that rotatably engages a front wheel, and a drive train that engages the rear wheel for driving the rear wheel. The rear rim of the rear wheel includes a rear groove that receives the plurality of rear bearings. The rear rim of the rear wheel includes a rear gear that is engaged by a drive sprocket from the drive train. The front rim of the front wheel includes a front groove that receives the plurality of front bearings.

16 Claims, 14 Drawing Sheets

SPOKELESS BICYCLE SYSTEM

BACKGROUND OF THE INVENTION

1. Field of the Invention

The present invention relates generally to bicycle devices and more specifically it relates to a spokeless bicycle system for providing a bicycle that does not have spokes within the wheels.

2. Description of the Prior Art

Bicycles have been in use for years. Typically, a bicycle is comprised of a frame, handle bars, a pair of wheels rotatably attached to the frame, and a chain connected between the rear wheel and the drive system of the bicycle. The wheels of a conventional bicycle typically have a plurality of spokes that extend from a central hub to the interior surface of the rim of the wheel.

Conventional bicycles with wheels that have spokes is that the user constantly has to maintain the tension upon the spokes especially during rough riding conditions. If the user does not maintain the tension upon the spokes the wheel will not provide the desired performance for the user. Bicycles that utilize wheels with spokes are also dangerous in the respect that clothing and feet often times are caught within the spokes sometimes leading to injury of the rider.

Examples of attempted solutions to conventional bicycles include U.S. Pat. No. 5,626,354 to Elliot; U.S. Pat. No. 5,316,327 to Bell; U.S. Pat. No. 5,423,560 to Warrick et al.; U.S. Pat. No. 5,271,635 to Lu which are all illustrative of such prior art.

Elliot (U.S. Pat. No. 5,626,354) discloses a bicycle transmission. Elliott specifically teaches a continuously variable friction drive transmission by driving the rear bicycle wheel by frictional engagement with a rotating rim driver.

While these devices may be suitable for the particular purpose to which they address, they are not as suitable for providing a bicycle that does not have spokes within the wheels. Conventional bicycle devices require the utilization of wheels with a plurality of spokes which are undesirable.

In these respects, the spokeless bicycle system according to the present invention substantially departs from the conventional concepts and designs of the prior art, and in so doing provides an apparatus primarily developed for the purpose of providing a bicycle that does not have spokes within the wheels.

SUMMARY OF THE INVENTION

In view of the foregoing disadvantages inherent in the known types of bicycle devices now present in the prior art, the present invention provides a new spokeless bicycle system construction wherein the same can be utilized for providing a bicycle that does not have spokes within the wheels.

The general purpose of the present invention, which will be described subsequently in greater detail, is to provide a new spokeless bicycle system that has many of the advantages of the bicycle devices mentioned heretofore and many novel features that result in a new spokeless bicycle system which is not anticipated, rendered obvious, suggested, or even implied by any of the prior art bicycle devices, either alone or in any combination thereof.

To attain this, the present invention generally comprises a frame having a seat structure and handle bars, a rear bracket having rear bearings within that rotatably engages a rear wheel, a front bracket having front bearings within that rotatably engages a front wheel, and a drive train that engages the rear wheel for driving the rear wheel. The rear rim of the rear wheel includes a rear groove that receives the plurality of rear bearings. The rear rim of the rear wheel includes a rear gear that is engaged by a drive sprocket from the drive train. The front rim of the front wheel includes a front groove that receives the plurality of front bearings.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a spokeless bicycle system that will overcome the shortcomings of the prior art devices.

Another object is to provide a spokeless bicycle system that does not utilize wheels with a plurality of spokes.

An additional object is to provide a spokeless bicycle system that does not utilize a chain drive system.

A further object is to provide a spokeless bicycle system that utilizes a bearing tracking system instead of traditional center pivoting bearing designs to rotatably support the frame upon the wheels.

Another object is to provide a spokeless bicycle system that reduces the chance of injury to the rider.

A further object is to provide a spokeless bicycle system that increases the appearance of the bicycle.

An additional object is to provide a spokeless bicycle system that is low maintenance and has an increased useful life.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
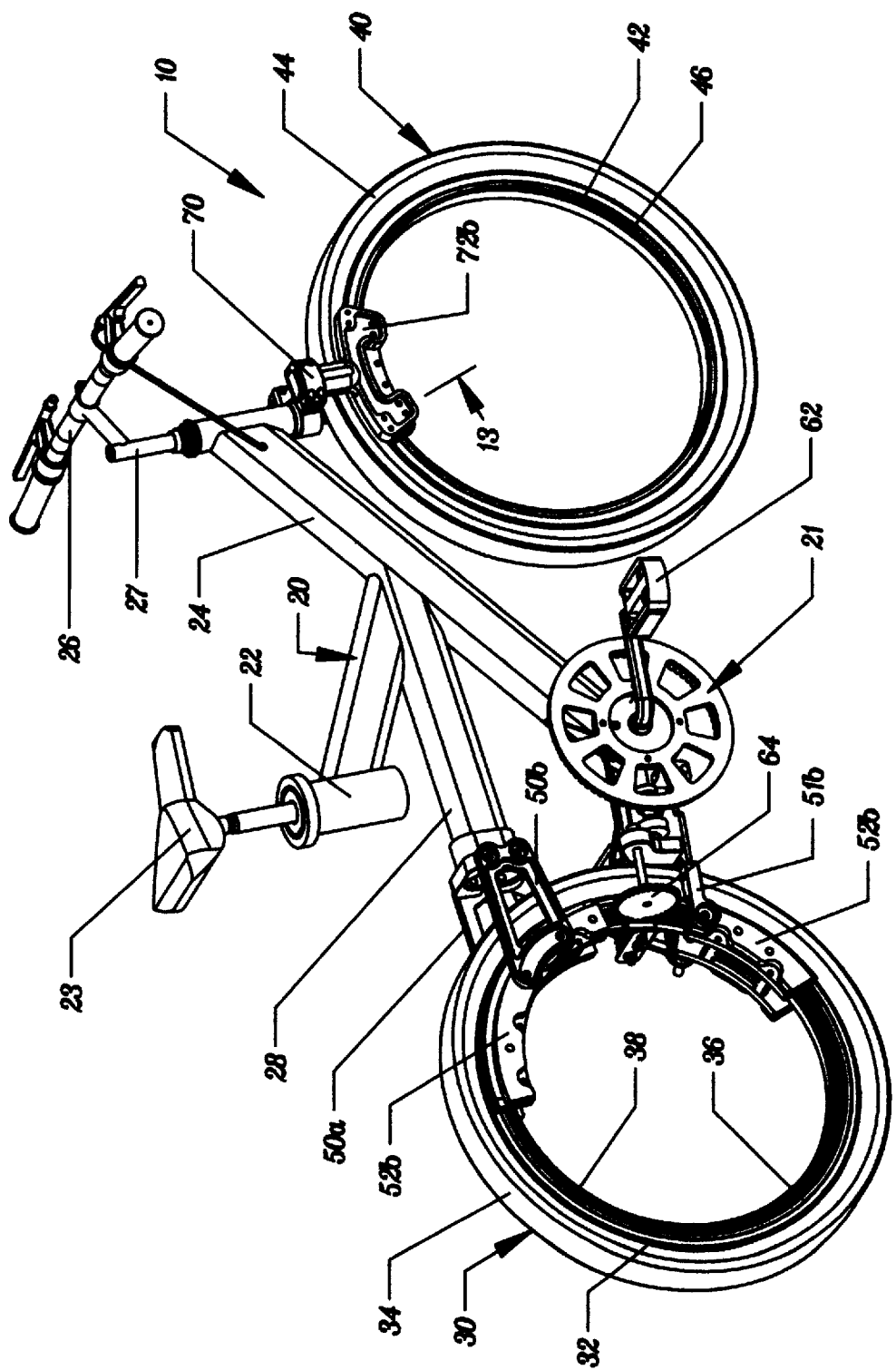
FIG. 1 is an upper rear perspective view of the present invention.
Figure 2:
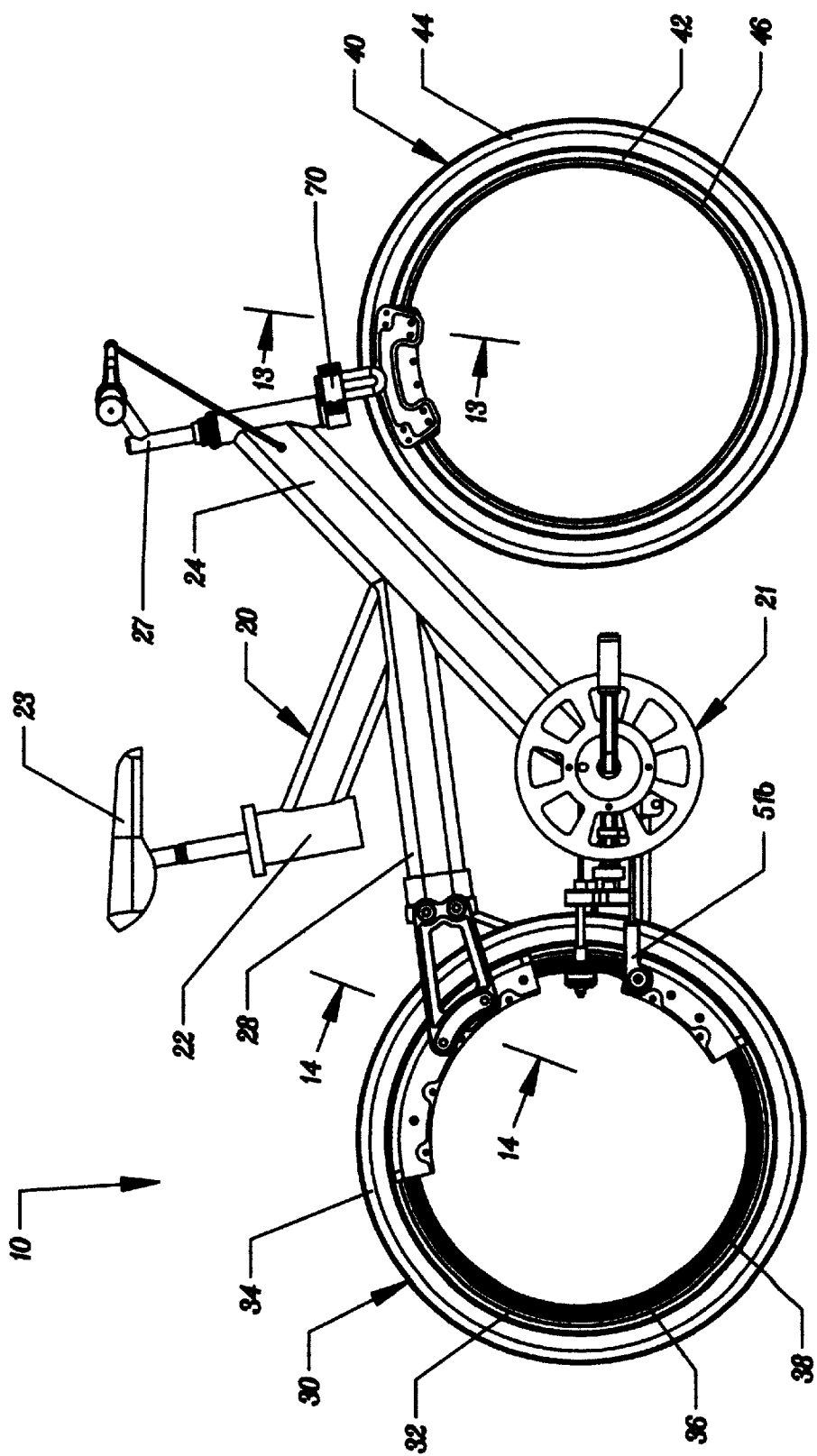
FIG. 2 is a right side view of the present invention.
Figure 3:
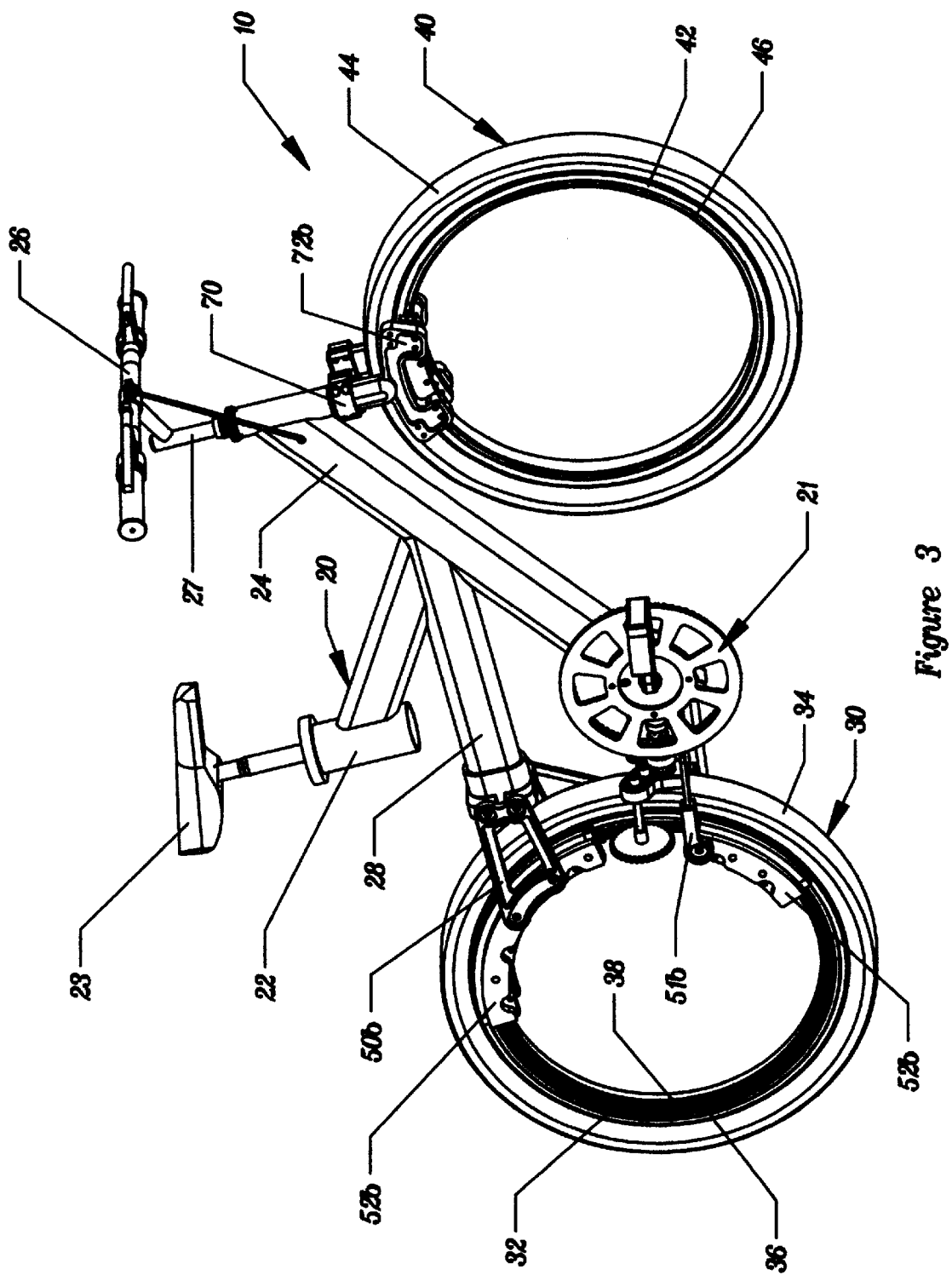
FIG. 3 is an upper front perspective view of the present invention.
Figure 4:
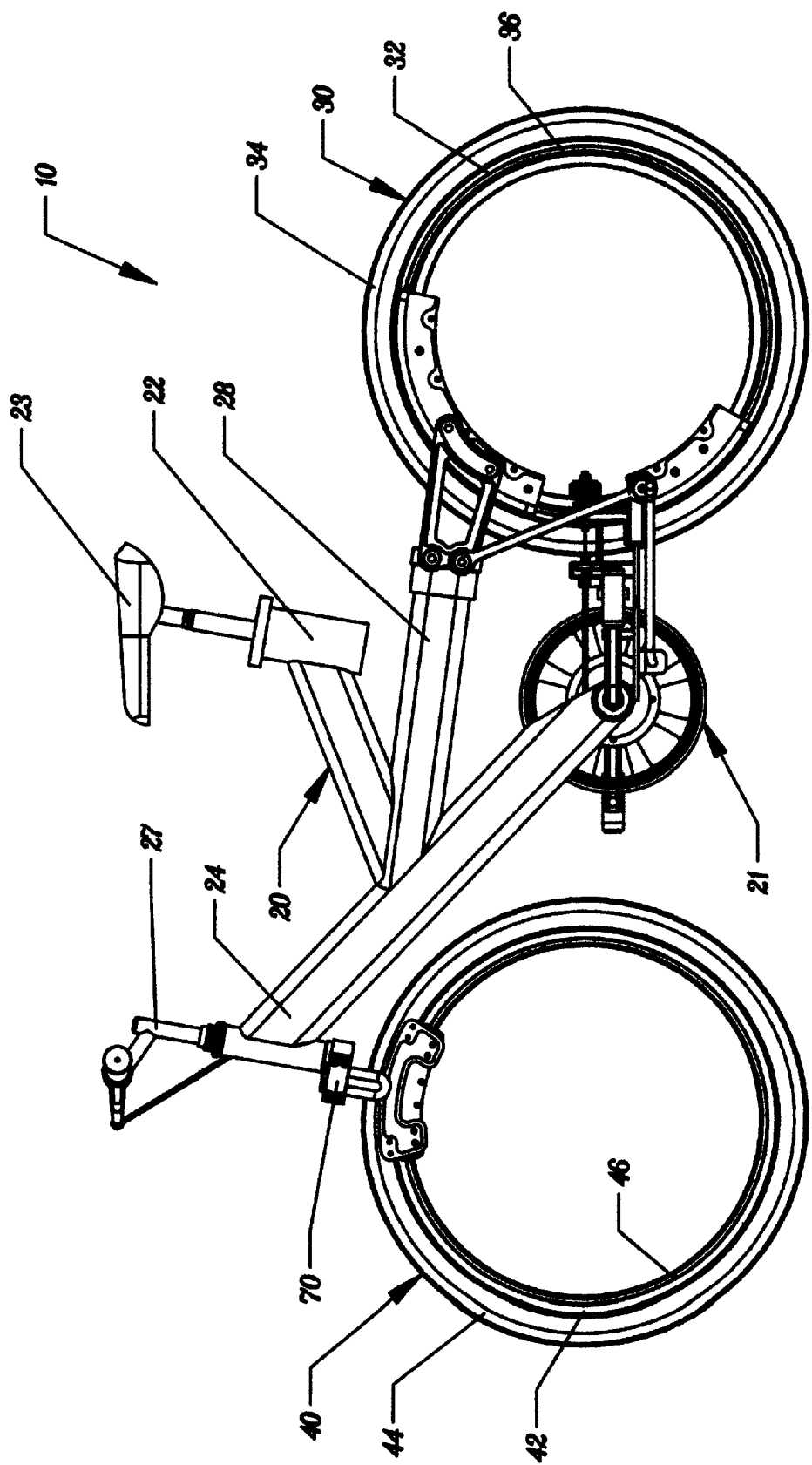
FIG. 4 is a left side view of the present invention.
Figure 5:
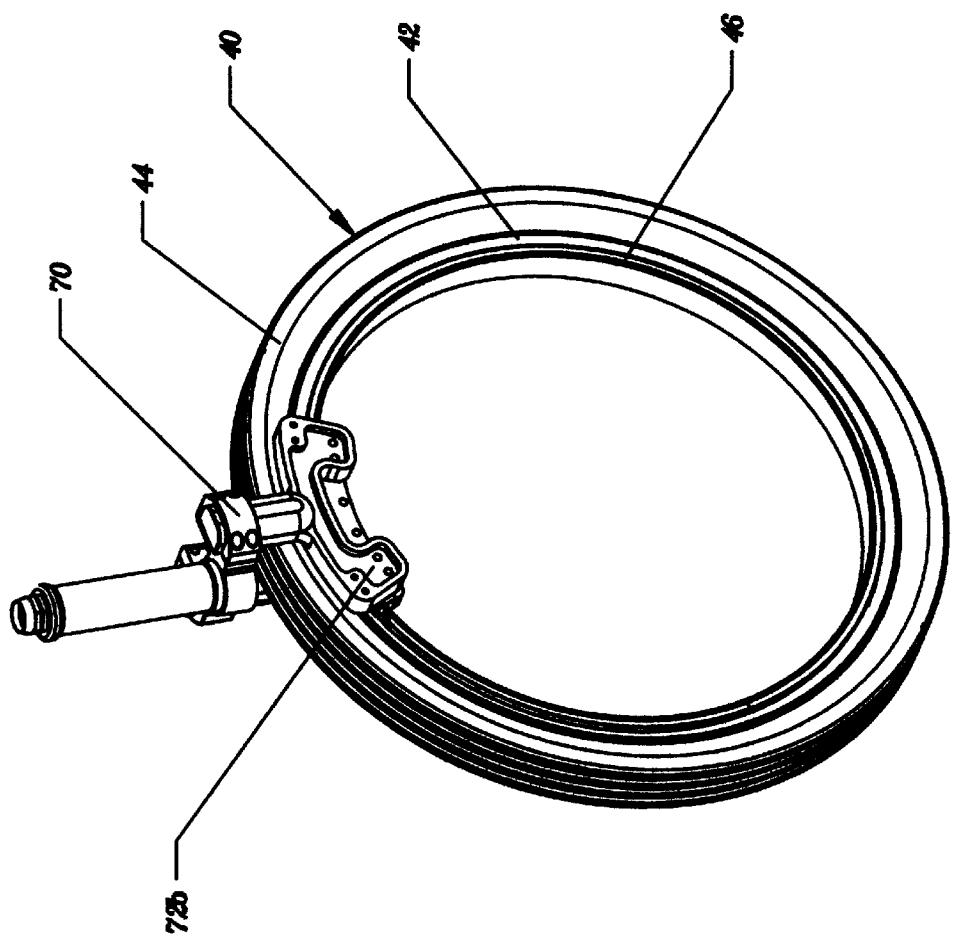
FIG. 5 is an upper perspective view of the front wheel.
Figure 6:
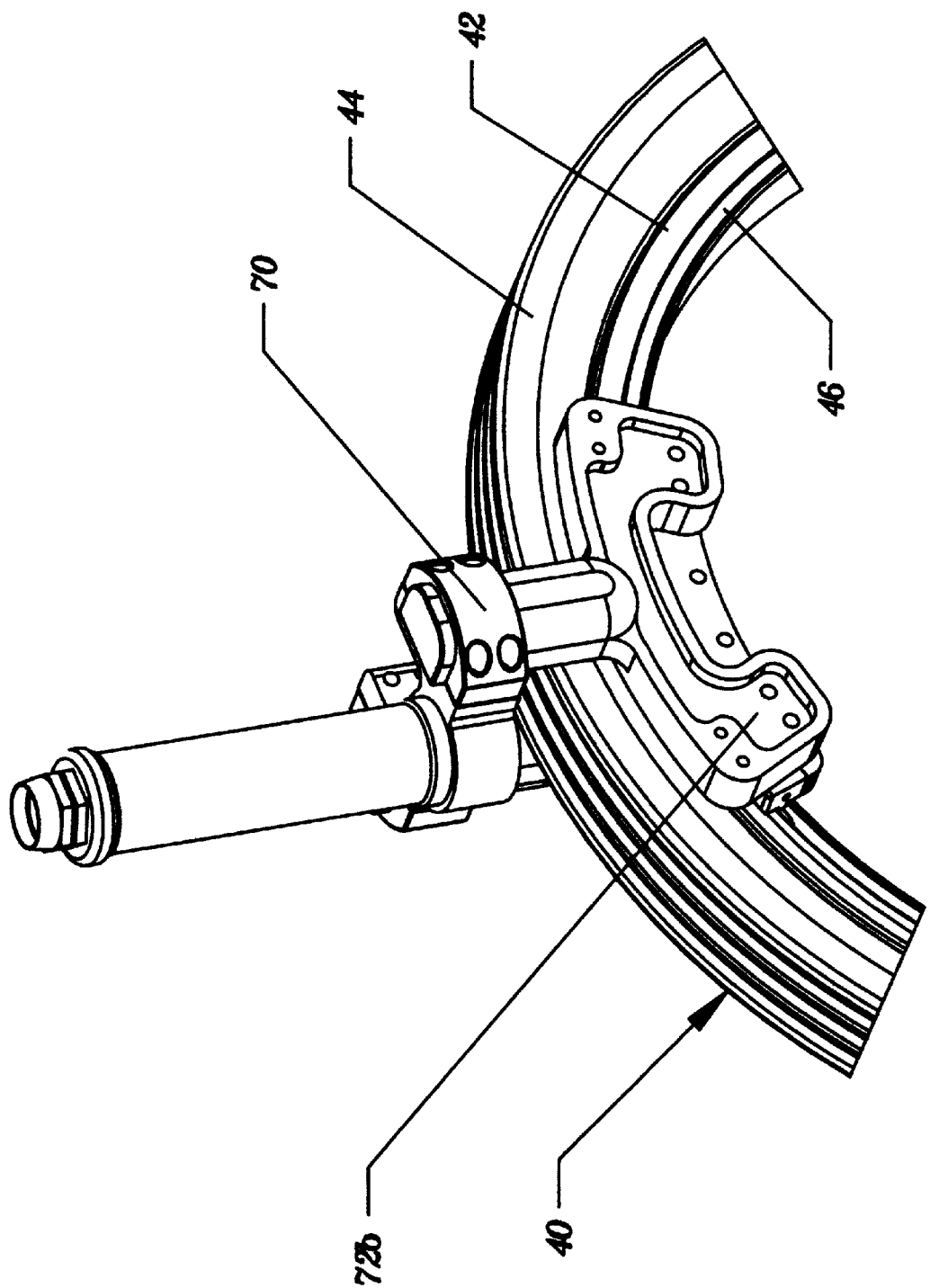
FIG. 6 is a magnified view of the front bracket rotatably supported upon the front wheel.
Figure 7:
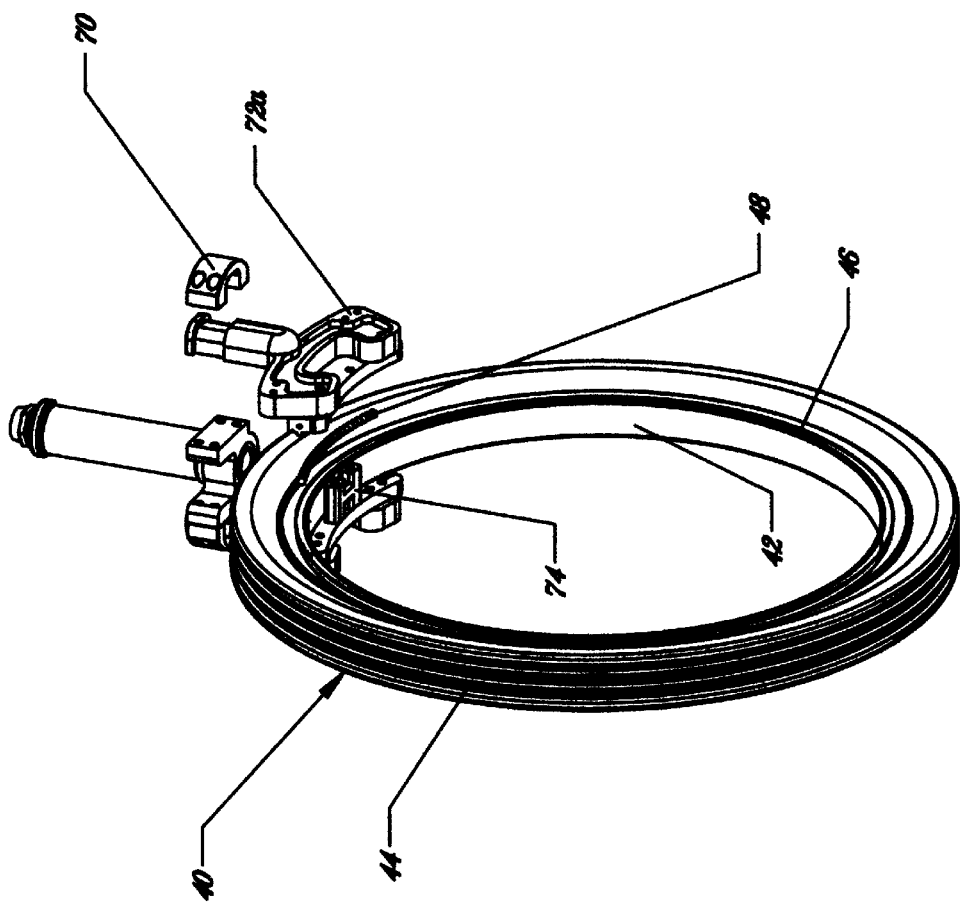
FIG. 7 is an exploded lower perspective view of the front wheel and front bracket.
Figure 8:
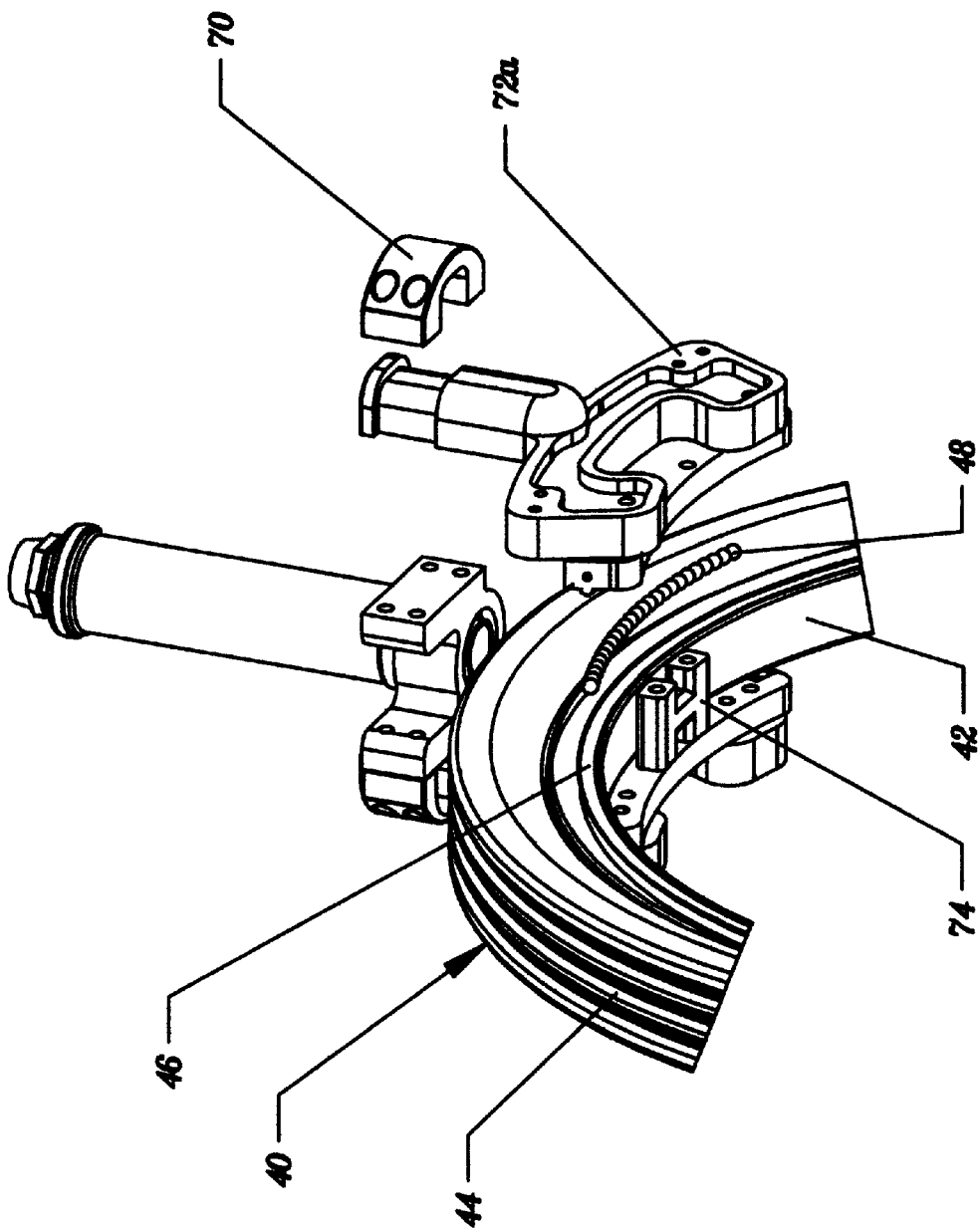
FIG. 8 is an exploded lower perspective view of the front wheel and front bracket.
Figure 9:
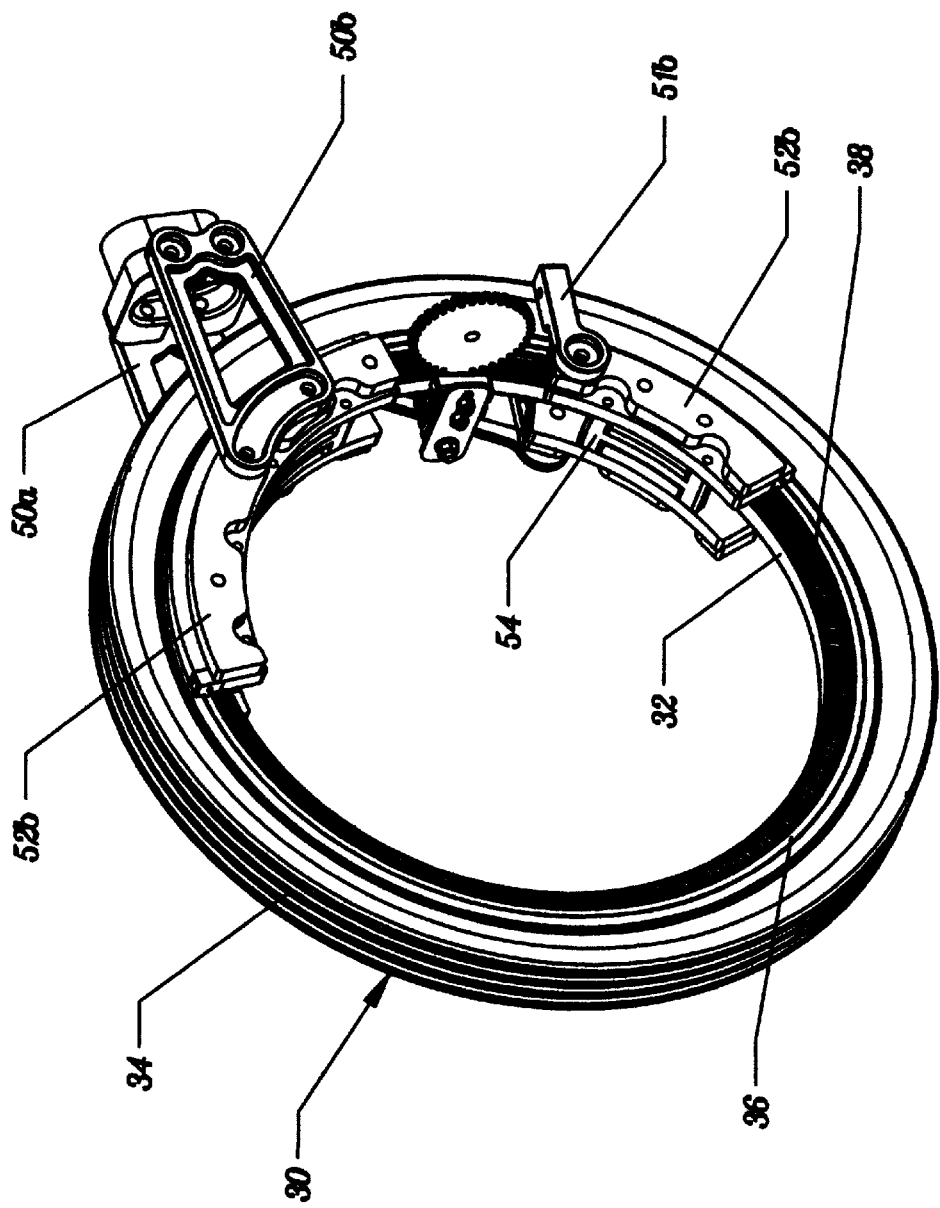
FIG. 9 is a rear upper perspective view of the rear wheel and rear bracket.
Figure 10:
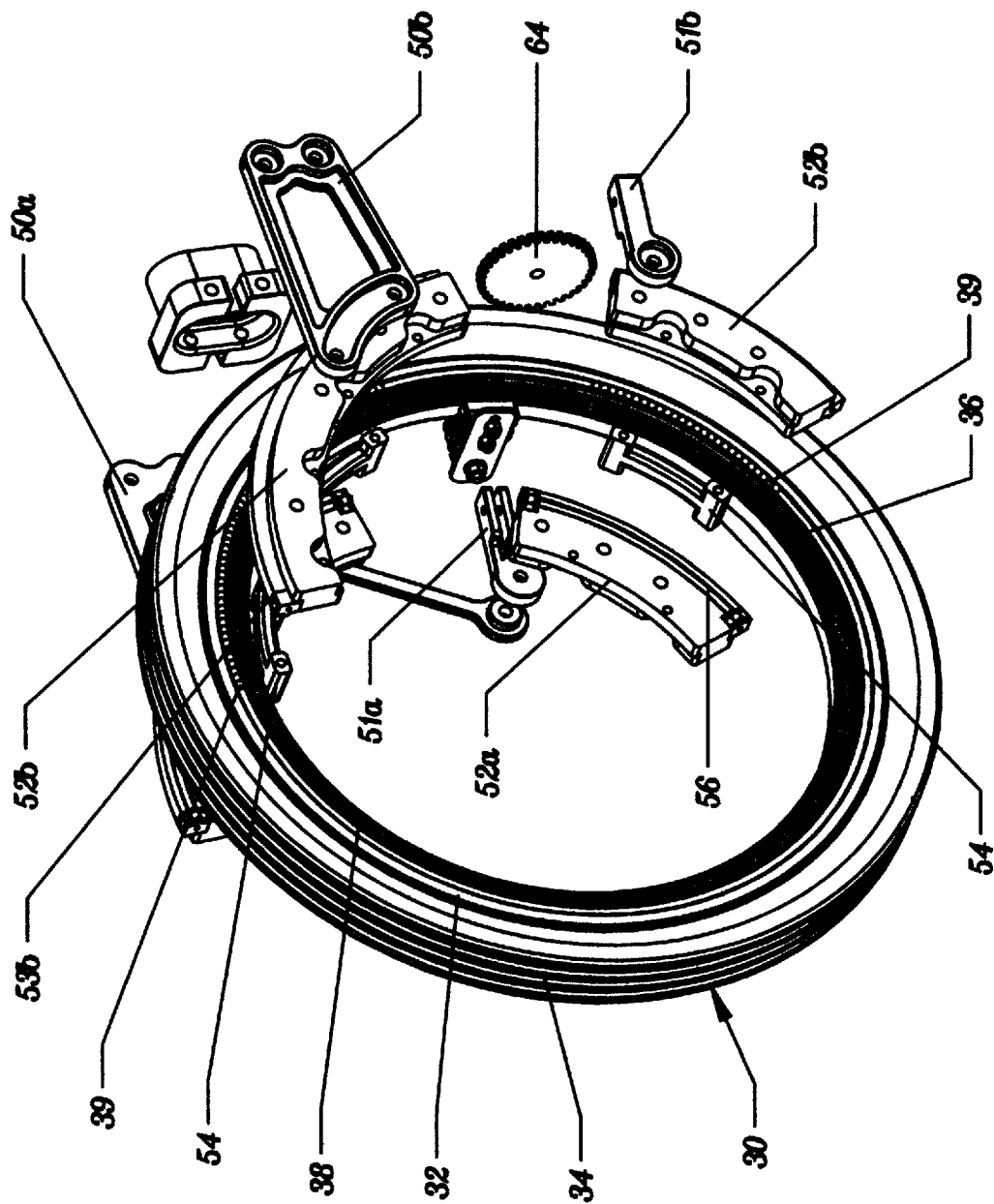
FIG. 10 is an exploded upper perspective view of the rear wheel and rear bracket.
Figure 11:
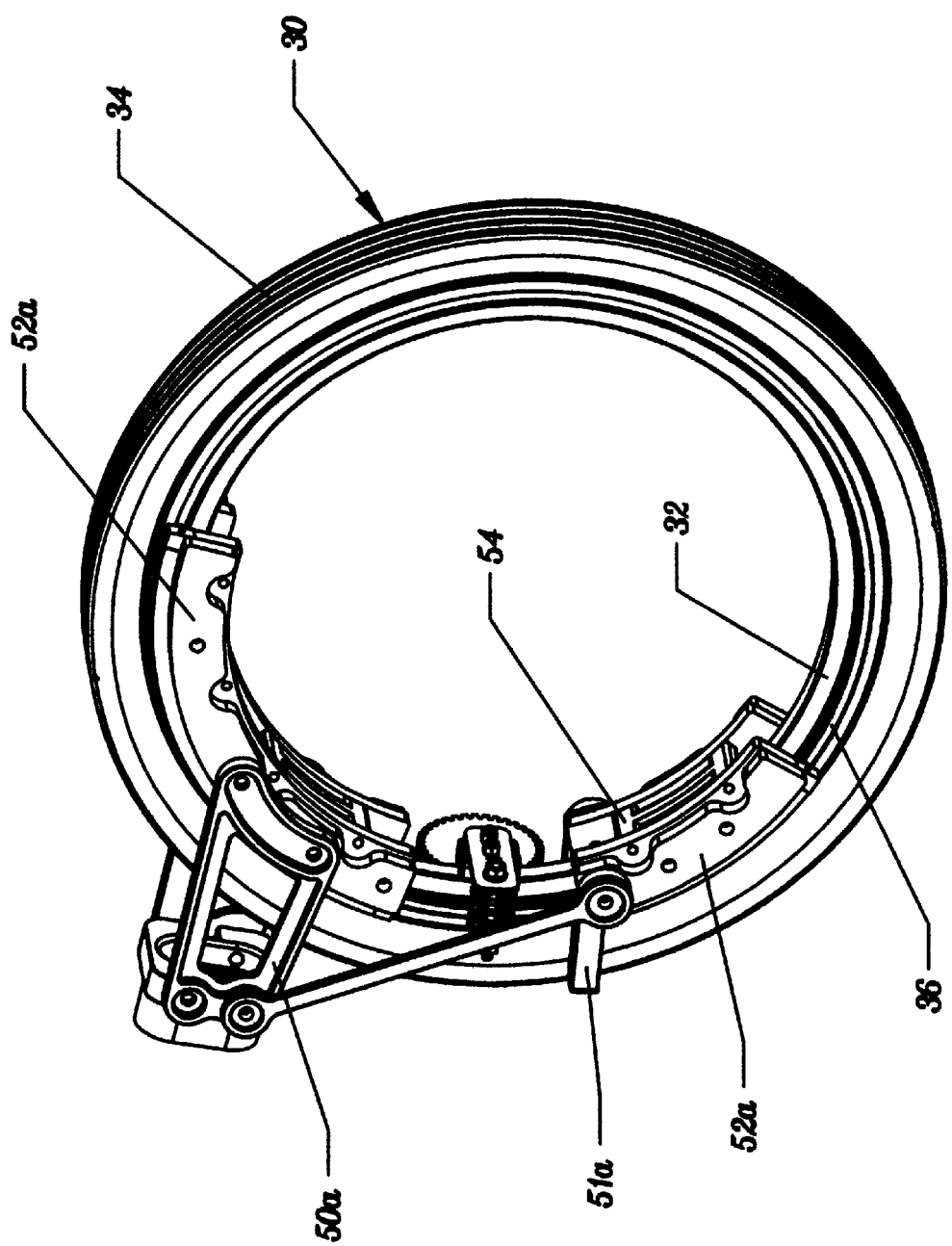
FIG. 11 is a left side perspective view of the rear wheel and rear bracket.
Figure 12:
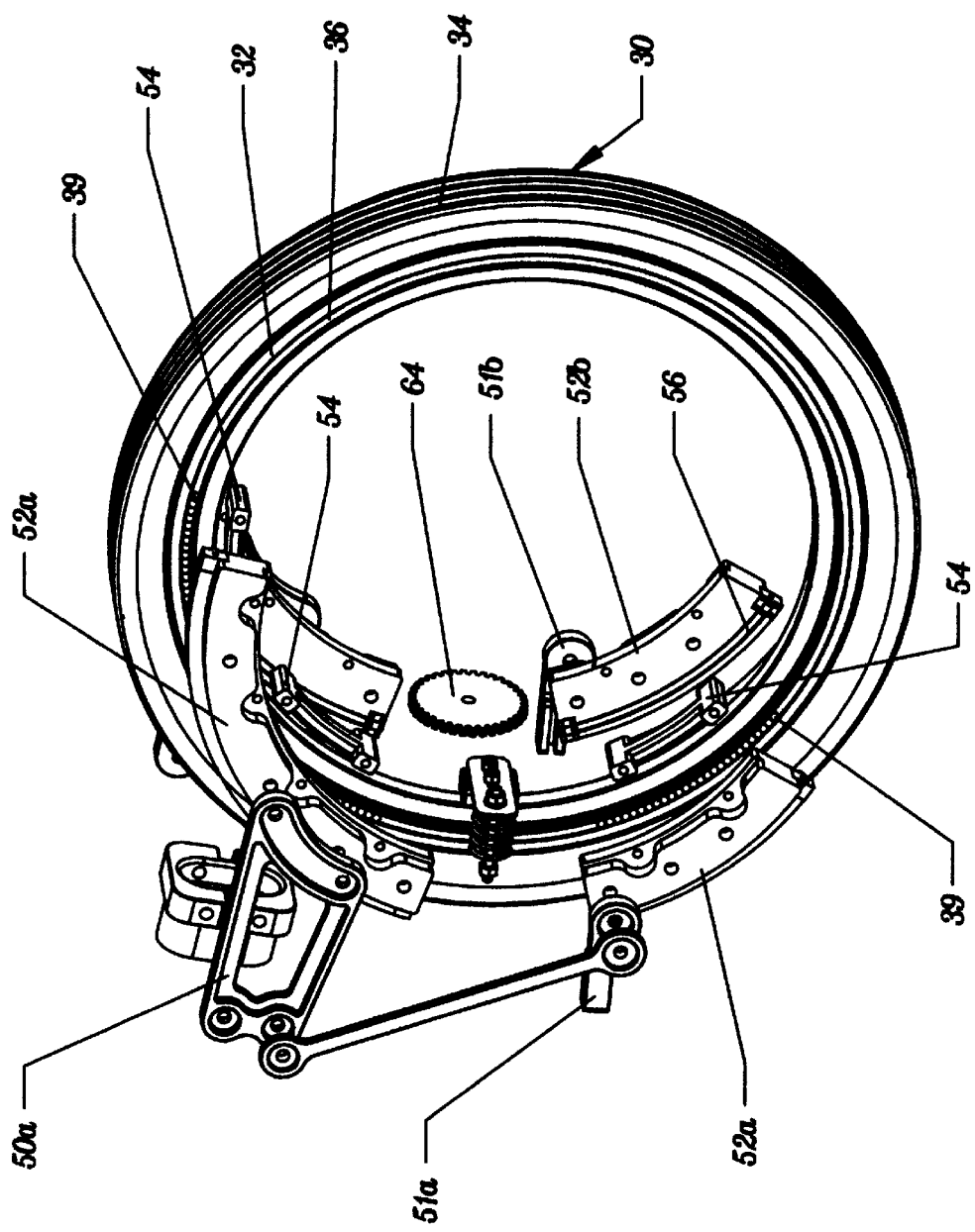
FIG. 12 is a left side exploded upper perspective view of the rear wheel and rear bracket.

Turning now descriptively to the drawings, in which similar reference characters denote similar elements throughout the several view, FIGS. 1 through 14 illustrate a spokeless bicycle system 10, which comprises a frame 20 having a seat structure 22 and handle bars 26, a rear bracket having rear bearings 39 within that rotatably engages a rear wheel 30, a front bracket 70 having front bearings 48 within that rotatably engages a front wheel 40, and a drive train that engages the rear wheel 30 for driving the rear wheel 30. The rear rim 32 of the rear wheel 30 includes a rear groove that receives the plurality of rear bearings 39. The rear rim 32 of the rear wheel 30 includes a rear gear 38 that is engaged by a drive sprocket 64 from the drive train. The front rim 42 of the front wheel 40 includes a front groove 46 that receives the plurality of front bearings 48.

As shown in FIGS. 1 through 4 of the drawings, the frame 20 is similar to conventional bicycle frames. The frame 20 includes an angled member 24 that extends between the front portion and the rear portion of the frame 20 at an angle. A horizontal member 28 is attached to the middle portion of the angled member 24 and extends rearwardly from the angled member 24. A seat structure 22 is attached to the upper distal end of the horizontal member 28 that includes a padded seat 23 for the user to sit upon. It can be appreciated by one skilled in the art that the frame 20 may be comprised of various other designs and structures, hence the above description of the frame 20 is merely one embodiment that could be utilized to construct the present invention.

As best shown in FIGS. 1 through 4 of the drawings, a steering shaft 27 is rotatably attached to the upper end of the angled member 24 for attaching to the front bracket 70. A pair of handle bars 26 are attached to the upper end of the steering shaft 27 as best shown in FIGS. 1 through 4 of the drawings.

As shown in FIGS. 1 through 4 of the drawings, a power train 21 is attached to the lower portion of the angled member 24 for allowing the user to apply power to the rear wheel 30. The power train 21 is comprised of a pair of pedals 62 that are mechanically coupled to a drive sprocket 64 through any well-known gear means. The drive sprocket 64 engages the rear gear 38 of the rear wheel 30 for rotating the rear wheel 30.

As shown in FIGS. 1 through 4 and FIGS. 9 through 12 of the drawings, the rear wheel 30 is comprised of a rear rim 32 supporting a rear tire 34. The rear tire 34 is comprised of any well-known design and material. The rear rim 32 is comprised of any well-known material. The rear rim 32 also includes a rear gear 38 as best shown in FIG. 9 through 12 of the drawings. The rear rim 32 of the rear wheel 30 includes a pair of opposing rear grooves 36 within opposing sides of the rear rim 32 for receiving two sets of a plurality of rear bearings 39.

Figure 14:
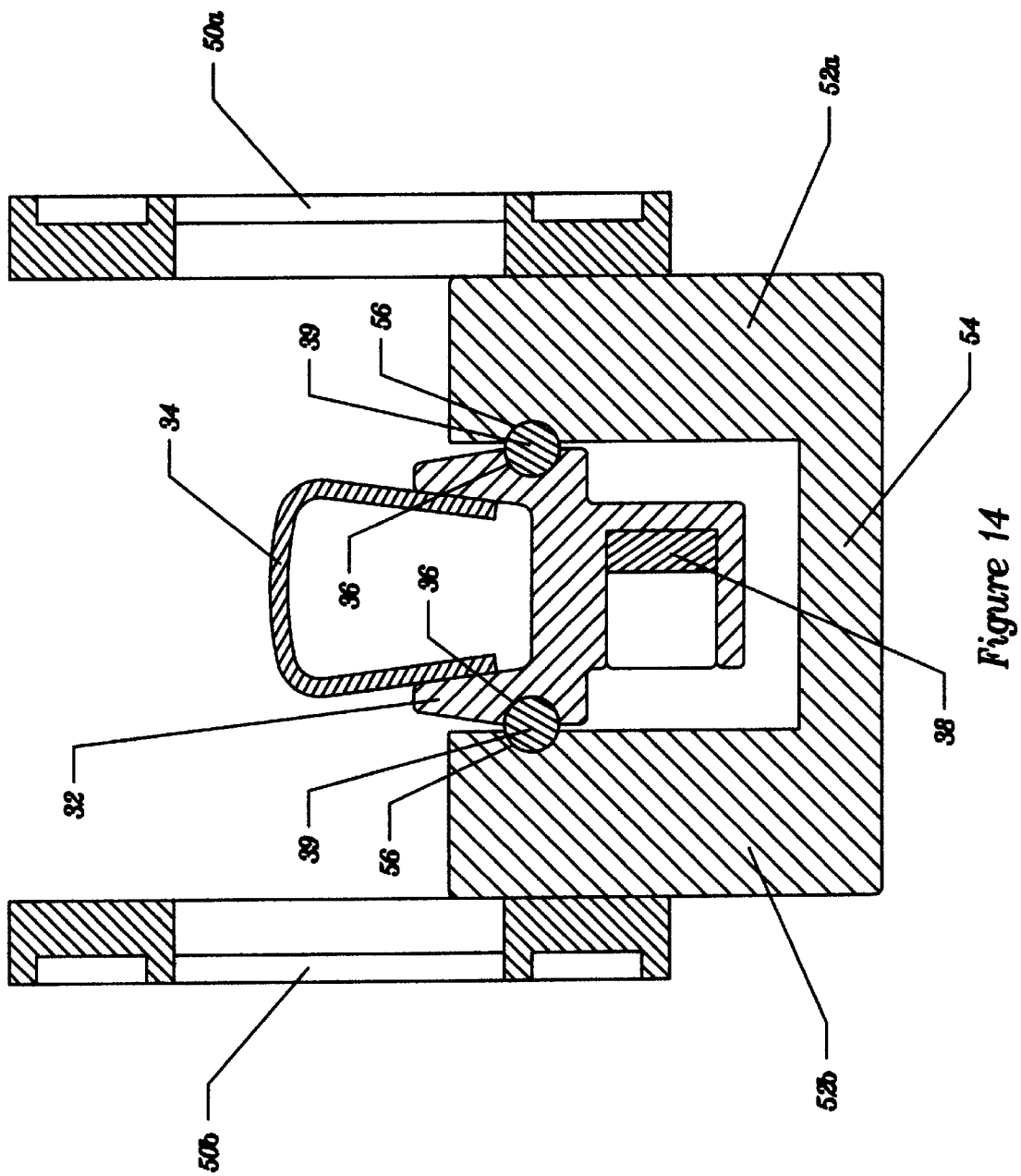
FIG. 14 is a cross sectional view taken along line 14—14 of FIG. 2 showing the rear wheel and rear bracket along with the rear gear structure.

As best shown in FIG. 14 of the drawings, the pair of opposing rear grooves 36 receive the two sets of rear bearings 39. The rear bearings 39 are comprised of a plurality of spherical bearing members that are well-known in the art.

As shown in FIGS. 1 through 4 of the drawings, a pair of rear brackets 50a–b are attached to the distal end of the horizontal member 28. The pair of rear brackets 50a–b are attached to a pair of corresponding rear side members 52a–b that extend about the rear wheel 30 adjacent the rear rim 32. The rear side members 52a–b are connected to one another by a rear cross member 54.

The rear side members 52a–b include opposing rear channels 56 that face one another and that are aligned with the rear grooves 36 within the rear wheel 30 as shown in FIG. 14 of the drawings. The rear grooves 36 are arcuate shaped and receive a portion of the rear bearings 39. As best shown in FIG. 14 of the drawings, the rear bearings 39 are rotatably positioned within the rear grooves 36 and the rear channels 56 between the rear rim 32 and the rear side members 52a–b.

As shown in FIGS. 1 through 4 of the drawings, a pair of rear side beams 51a–b are attached to the frame 20. Another set of rear side members 52a–b are attached to the rear side beams 51a–b which include a corresponding pair of opposing rear grooves 36 for receiving rear bearings 39. A rear cross member 54 extends between the rear side members 52a–b also. A support member extends between the horizontal member 28 and one of the rear side beams 51a–b to assist in supporting the rear side members 52a–b.

As shown in FIGS. 1 through 8 of the drawings, the front wheel 40 is comprised of a front rim 42 supporting a front tire 44. The front tire 44 is comprised of any well-known design and material. The front rim 42 is comprised of any well-known material. The front rim 42 of the front wheel 40 includes a pair of opposing front grooves 46 within opposing sides of the front rim 42 for receiving two sets of a plurality of front bearings 48 similar to the rear rim 32 of the present invention.

Figure 13:
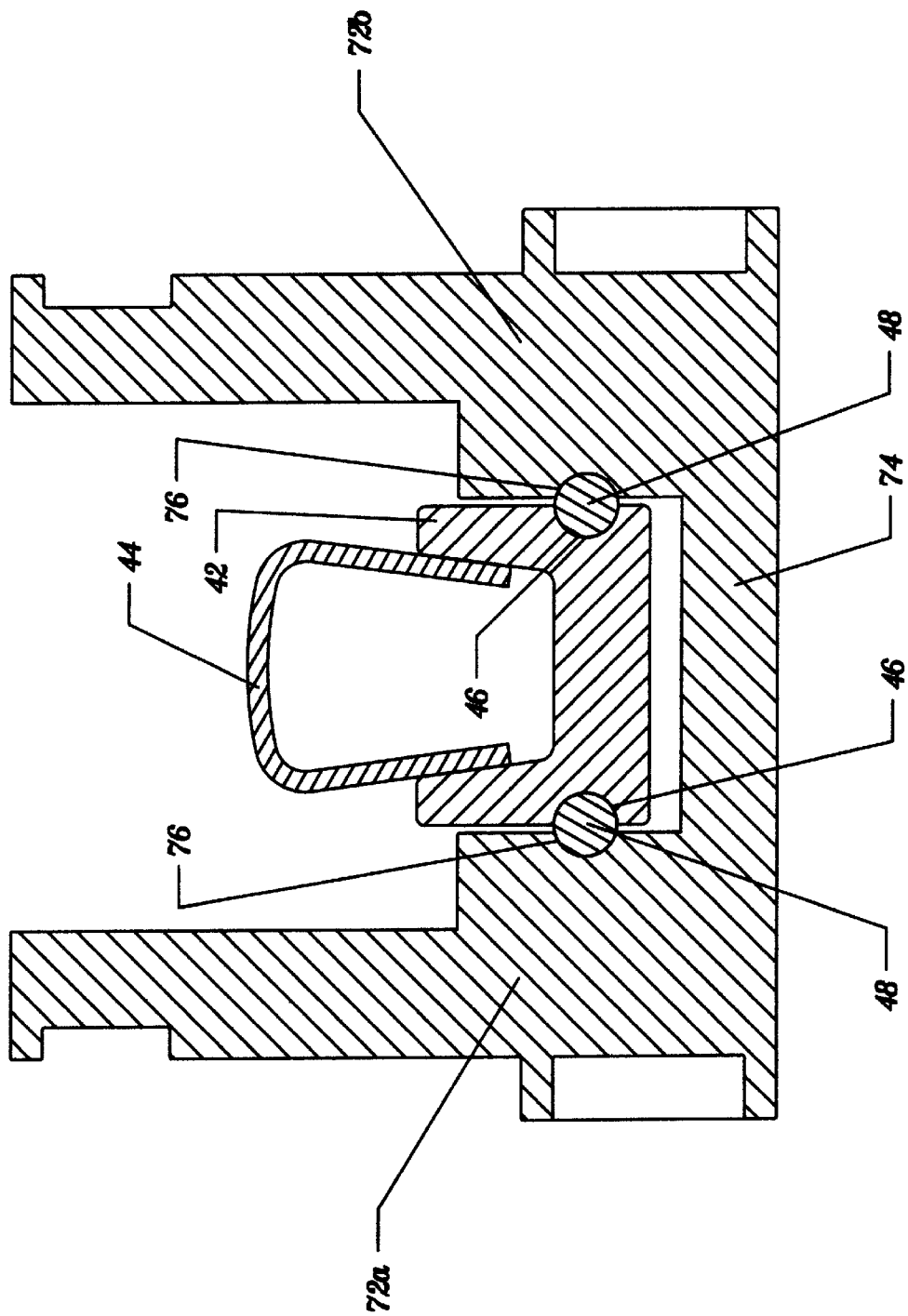
FIG. 13 is a cross sectional view taken along line 13—13 of FIG. 2 showing the front wheel and front bracket.

As best shown in FIG. 13 of the drawings, the pair of opposing front grooves 46 receive the two sets of front bearings 48. The front bearings 48 are comprised of a plurality of spherical bearing members that are well-known in the art.

The front bracket 70 is attached to the lower portion of the steering shaft 27 as shown in FIGS. 1 through 8 of the drawings. The front bracket 70 is comprised of a pair of front side members 72a–b that are positioned about the sides of the front wheel 40 and adjacent the front rim 42. A front cross member 74 extends between the front side members 72a–b as shown in FIG. 13 of the drawings. The inner surfaces of the front side members 72a–b include a pair of opposing front channels 76 that receive the set of front bearings 48.

In use, the user sits upon the padded seat 23 and engages the pedals 62 with their feet. The user rotates the pedals 62 upon the power train 21 thereby causing the drive sprocket 64 to rotate which mechanically engages the rear gear 38 thereby rotating the rear wheel 30. As the rear wheel 30 rotates moving the invention forwardly or rearwardly, the rear bearings 39 rotate within the rear grooves 36 and the rear channels 56 and the front bearings 48 rotate within the front grooves 46 and the front channels 76 thereby supporting the frame 20 in an upright position. The above process continues until the user desires to no longer utilize the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Spokeless Bicycle System
ENVIRONMENTAL ELEMENTS
10. Spokeless Bicycle System
11.
12.
13.
14.
15.
16.
17.
18.
19.
20. Frame
21. Power Train
22. Seat Structure
23. Padded Seat
24. Angled Member
25.
26. Handle Bars
27. Steering Shaft
28. Horizontal Member
29.
30. Rear Wheel
31.
32. Rear Rim
33.
34. Rear Tire
35.
36. Rear Grooves
37.
38. Rear Gear
39. Rear Bearings
40. Front Wheel
41.
42. Front Rim
43.
44. Front Tire
45.
46. Front Grooves
47.
48. Front Bearings
49.
50. Rear Bracket (a–b)
51. Rear Side Beams (a–b)
52. Rear Side Members (a–b)
53.
54. Rear Cross Member
55.
56. Rear Channel
57.
58.
59.
60.
61.
62. Pedals
63.
64. Drive Sproket
65.
66.
67.
68.
69.
70. Front Bracket
71.
72. Front Side Members (a–b)
73.
74. Front Cross Member
75.
76. Front Channel
77.
78.
79.

I claim:

1. A spokeless bicycle system, comprising:
a frame having a front portion and a rear portion;
a rear support structure attached to said rear portion;
a rear wheel rotatable connected to said rear support structure, wherein said rear wheel is comprised of a rear rim and a rear tire;
a drive means attached to said frame and mechanically connected to said rear wheel for rotating said rear wheel;
a front support structure attached to said front portion;
a front wheel rotatable connected to said front support structure, wherein said front wheel is comprised of a front rim and a front tire;
wherein said rear rim and said front rim each include opposing grooves for receiving a plurality of bearings from said rear support structure and said front support structure respectively; and wherein said front support structure is comprised of:
- a pair of front side members positioned adjacent opposing sides of said front rim; and
- a pair of opposing front channels within interior surfaces of said pair of front side members for receiving said plurality of bearings.

2. The spokeless bicycle system of claim 1, wherein said rear support structure is comprised of:
- a pair of rear side members positioned adjacent opposing sides of said rear rim; and
- a pair of opposing rear channels within interior surfaces of rear pair of rear side members for receiving said plurality of bearings.

3. The spokeless bicycle system of claim 1, wherein said front support structure further includes a front cross member between said pair of front side members.

4. The spokeless bicycle system of claim 1, wherein said rear support structure further includes a rear cross member between said pair of rear side members.

5. A spokeless bicycle system, comprising:
- a frame having a front portion and a rear portion, wherein a rear support structure is attached to said rear portion and a front support structure is attached to said front portion;
- a rear wheel rotatably connected to said rear support structure, wherein said rear wheel includes a rear rim having opposing grooves for receiving a plurality of bearings from said rear support structure;
- a front wheel rotatably connected to said front support structure, wherein said front wheel includes a front rim having opposing grooves for receiving a plurality of bearings from said front support structure; and
- said front support structure is comprised of a pair of front side members positioned adjacent opposing sides of said front rim, and a pair of opposing front channels within interior surfaces of said pair of front side members for receiving said plurality of bearings.

6. The spokeless bicycle system of claim 5, including a drive means attached to said frame and mechanically connected to said rear wheel for rotating said rear wheel.

7. The spokeless bicycle system of claim 5, wherein said rear support structure is comprised of:
- a pair of rear side members positioned adjacent opposing sides of said rear rim; and
- a pair of opposing rear channels within interior surfaces of rear pair of rear side members for receiving said plurality of bearings.

8. The spokeless bicycle system of claim 5, wherein said front support structure further includes a front cross member between said pair of front side members.

9. The spokeless bicycle system of claim 5, wherein said rear support structure further includes a rear cross member between said pair of rear side members.

10. The spokeless bicycle system of claim 5, wherein said rear support structure further includes a rear cross member between said pair of rear side members.

11. A spokeless bicycle system, comprising:
- a frame having a front portion and a rear portion, wherein a rear support structure is attached to said rear portion and a front support structure is attached to said front portion;
- a rear wheel rotatably connected to said rear support structure, wherein said rear wheel includes a rear rim and a rear tire, wherein said rear rim includes a pair of opposing grooves for receiving a plurality of bearings from said rear support structure;
- a front wheel rotatably connected to said front support structure, wherein said front wheel includes a front rim and a front tire, wherein said front rim includes a pair of opposing grooves for receiving a plurality of bearings from said front support structure; and
- said front support structure is comprised of a pair of front side members positioned adjacent opposing sides of said front rim, and a pair of opposing front channels within interior surfaces of said pair of front side members for receiving said plurality of bearings.

12. The spokeless bicycle system of claim 11, including a drive means attached to said frame and mechanically connected to said rear wheel for rotating said rear wheel.

13. The spokeless bicycle system of claim 11, wherein said rear support structure is comprised of:
- a pair of rear side members positioned adjacent opposing sides of said rear rim; and
- a pair of opposing rear channels within interior surfaces of rear pair of rear side members for receiving said plurality of bearings.

14. The spokeless bicycle system of claim 11, wherein said front support structure further includes a front cross member between said pair of front side members.

15. The spokeless bicycle system of claim 11, wherein said rear support structure further includes a rear cross member between said pair of rear side members.

16. The spokeless bicycle system of claim 11, wherein said rear support structure further includes a rear cross member between said pair of rear side members.

* * * * *